March 21, 1961 G. M. PRO 2,976,025
COMBINED MIXER AND CONVEYOR
Filed Oct. 16, 1958 4 Sheets-Sheet 1

INVENTOR.
George M. Pro
BY
ATTORNEY.

March 21, 1961
G. M. PRO
2,976,025
COMBINED MIXER AND CONVEYOR
Filed Oct. 16, 1958
4 Sheets-Sheet 2
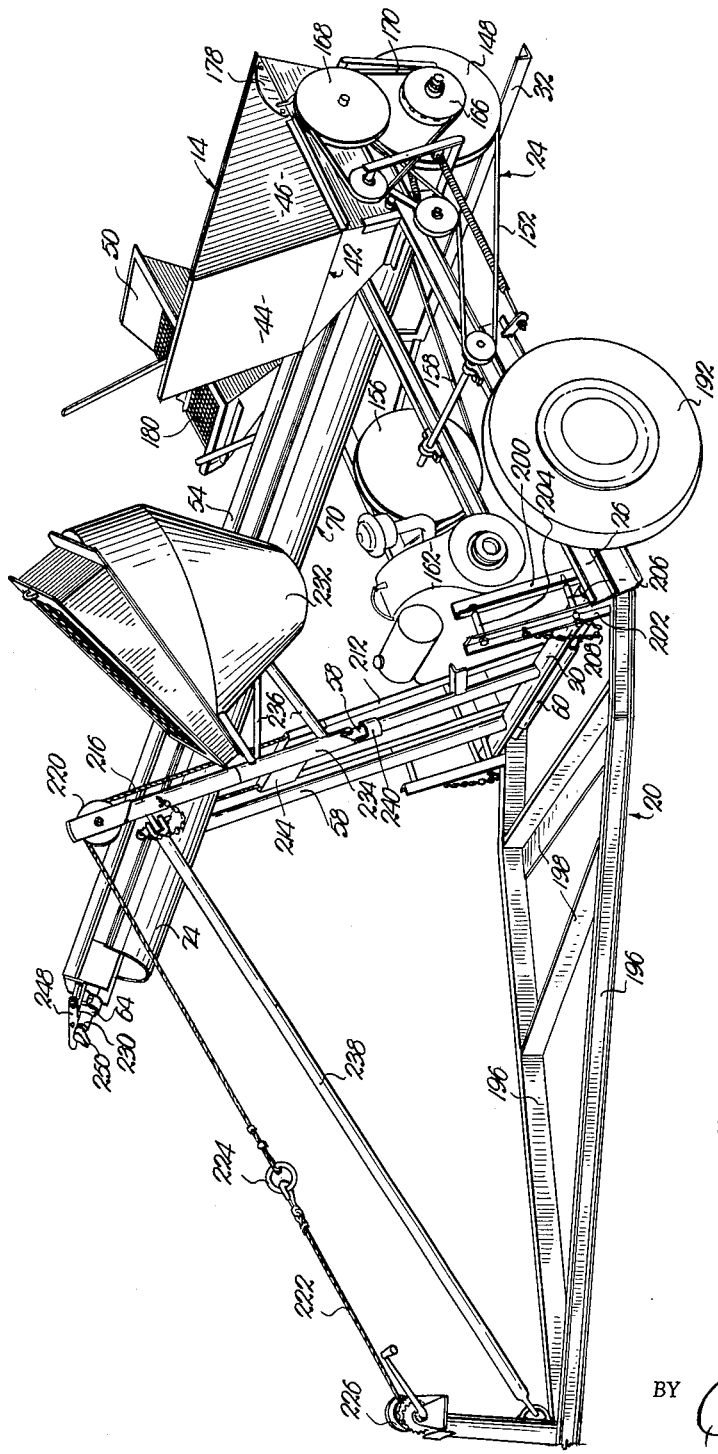
INVENTOR.
George M. Pro
BY
ATTORNEY.

March 21, 1961  G. M. PRO  2,976,025
COMBINED MIXER AND CONVEYOR
Filed Oct. 16, 1958  4 Sheets-Sheet 3

INVENTOR.
George M. Pro
BY
ATTORNEY.

March 21, 1961 G. M. PRO 2,976,025
COMBINED MIXER AND CONVEYOR
Filed Oct. 16, 1958 4 Sheets-Sheet 4
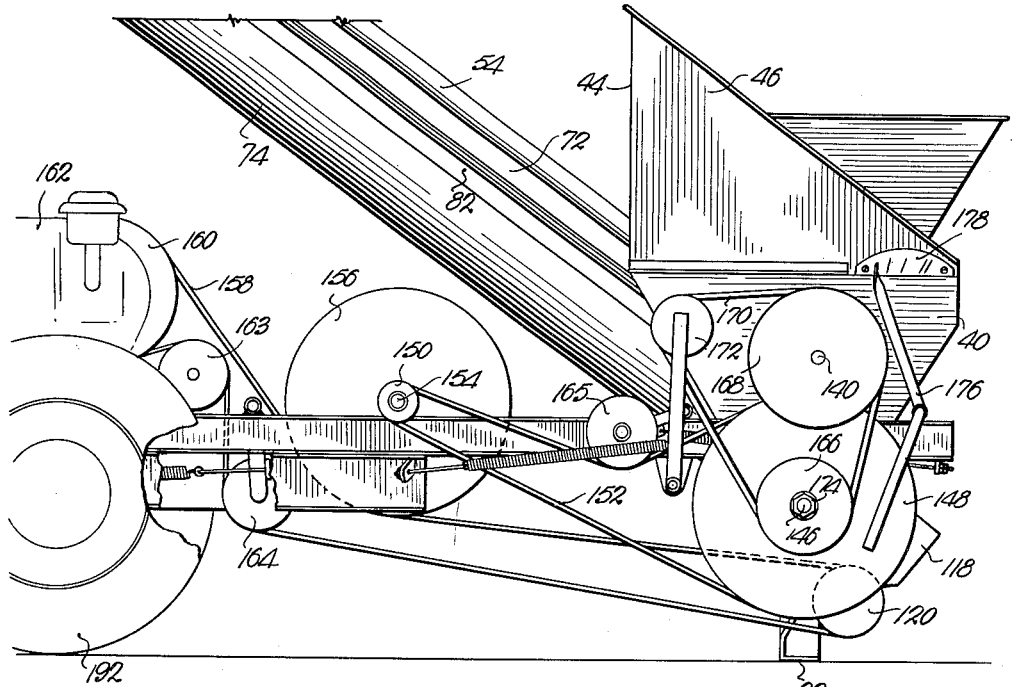
Fig. 5.
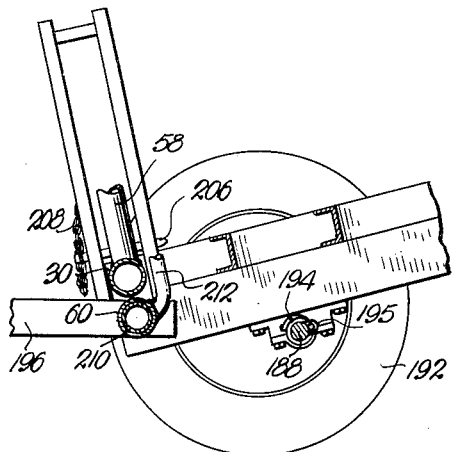
Fig. 6.
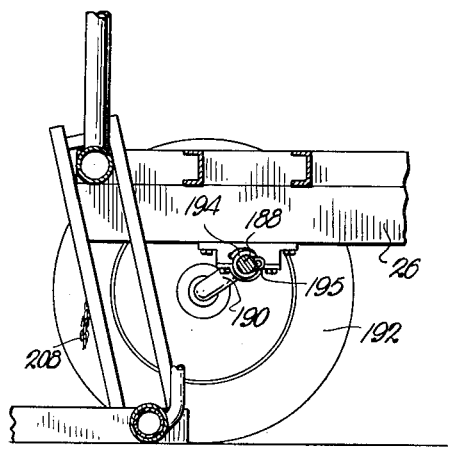
Fig. 7.
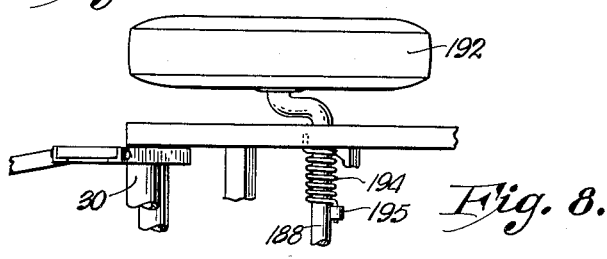
Fig. 8.
INVENTOR.
George M. Pro
BY
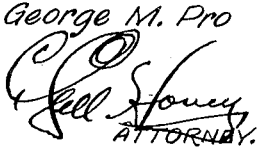
ATTORNEY.

United States Patent Office 2,976,025
Patented Mar. 21, 1961

2,976,025
COMBINED MIXER AND CONVEYOR

George M. Pro, Leawood, Kans., assignor to Air Placement Equipment Company, Kansas City, Mo., a corporation of Missouri Filed Oct. 16, 1958, Ser. No. 767,728

9 Claims. (Cl. 259—154)

This invention relates to material handling equipment and has for its primary object to provide a machine adapted for thoroughly mixing two different materials while simultaneously elevating the admixture to a desired level for discharge into a receptacle or additional apparatus.

It is an especially important object of the invention to provide a combined mixer and conveyor which has improved structure thereon designed to intimately admix dry sand and cement in predetermined proportions while also elevating the admixture to a point where the same may gravitate into a concrete gunning assembly or the like.

A further important object of the invention is to provide a combined mixer and elevator wherein very efficient admixing of the sand and cement is obtained by utilization of a helix conveyor within an inclined trough therefor, to the end that the materials are tumbled and agitated within the trough as they are moved upwardly to assure complete intermingling of the particles of each of the dry materials.

Also an important object is to provide a combined mixer and elevator particularly adapted for admixing sand and cement and provided with hoppers on the machine for each of the dry materials and constructed to translate particulate material from each of the same into the mixing and elevating conveyor at a predetermined rate, with the sand hopper disposed in relatively close proximity to the ground to permit easy hand shoveling of sand disposed on the ground into the open top of the sand hopper.

A still further object of the invention is to provide a combined mixer and elevator wherein power means is provided on the frame of the machine operably coupled with the material translating feed augers in each of the sand and cement hoppers, as well as to the material admixing and elevating conveyor disposed between the hoppers whereby the machine is rendered independent of externally supplied power sources and may be utilized at any desired location.

Another important object is to provide a combined mixer and elevator as described above having improved wheel structure thereon imparting roadability and portability to the equipment, yet permitting the main frame of the machine to be moved into engagement with the ground whereby the equipment is completely stable during utilization of the same to mix and elevate dry sand and cement.

Also an object of the invention is to provide a combined mixer and elevator for admixing sand and cement which is adapted to be operated by one man, notwithstanding the fact that it is necessary to continuously direct admixed material into the concrete gunning or other apparatus receiving the admixed material from the instant mixer and elevator.

Other important objects of the invention relate to the provision of novel means for driving the mixing and elevating conveyor without placing any stress whatsoever on the gear reducer operably coupling the helix conveyor with the power plant of the machine; to improved structure on the machine permitting selective manual variation of the proportion of sand to cement delivered from respective hoppers into the combination mixer and elevating conveyor disposed between the material hoppers; to the provision of improved trough structure having the combination mixing and elevating screw therein, which includes a longitudinally extending, centrally disposed boot or section of a flexible, wear-resistant composition and with the screw disposed in a position so that the peripheral edges of the vane thereof engage the flexible boot during rotation of the conveyor whereby, as materials within the trough begin to build up and form a coating between the marginal edge of the conveyor and the boot because of the troweling action of the vanes during rotation thereof, the area of the flexible boot directly beneath the coating thereby flexes to cause the latter to crumble and preventing continued build-up of material against the lower surface of the trough; to a combined mixer and elevator as referred to directly above wherein the flexible boot is provided with means at one longitudinal edge thereof releasably securing such edge to the trough whereby upon release of the defined edge of the boot, and thereby swinging of the same away from the conveyor, materials disposed in the trough may readily gravitate therefrom thus effecting rapid cleaning of the mixing and elevating portion of the machine; to the provision of trap door means at the lower end of each of the sand and cement hoppers permitting rapid clean-out of the same by merely opening the trap doors and permitting the material to gravitate from respective hoppers; to the provision of auger means at the lower end of the cement hopper disposed to direct cement into the mixing and elevating conveyor at a point spaced above the lower end of such conveyor to prevent packing of the cementitious material in the lower portion of the mixing and elevating assembly; to the provision of a machine as defined above wherein the cementitious material is directed into the mixing and elevating conveyor at a point above the area at which the sand is introduced into the conveyor to thereby assure better admixing of the particulate materials; to the provision of structure permitting one end of the machine to be tilted out of engagement with the ground and thereby supported on a pair of wheels and thus towed in trailer fashion from a suitable vehicle; to the provision of a combined mixer and elevator of rugged construction to assure a long useful life thereof with very little maintenance being required; and to other important objects and details of the instant equipment which will become clear or be explained more fully as the following specification progresses.

In the drawings:

Fig. 2 is a fragmentary, perspective view of the mixer and elevator shown in Fig. 1, with the main frame of the machine disposed in its elevated position to permit the equipment to be towed behind a suitable vehicle;

Fig. 5 is an enlarged, fragmentary, side elevational view of the mixer and elevator with the housing for certain of the belt and pulley assemblies being removed to show the details thereof, and certain other components being broken away to show the parts thereunder;

Figs. 6 and 7 are enlarged, fragmentary, vertical cross-sectional views showing the structure permitting the main frame of the machine to be raised and lowered with respect to the ground, the normal uppermost position of one end of the main frame being illustrated in Fig. 6 while the lower position thereof in engagement with the ground is shown in Fig. 7;

Fig. 8 is an enlarged, fragmentary, plan view of the structure shown in Figs. 6 and 7 and particularly showing the spring and axle means mounting each wheel on the main frame of the machine;

Fig. 10 is an enlarged, fragmentary, cross-sectional view at the lower end of the mixing and elevating conveyor illustrating the structure connecting the screw to the gear reducer drive means therefor.

Figures 1, 9:
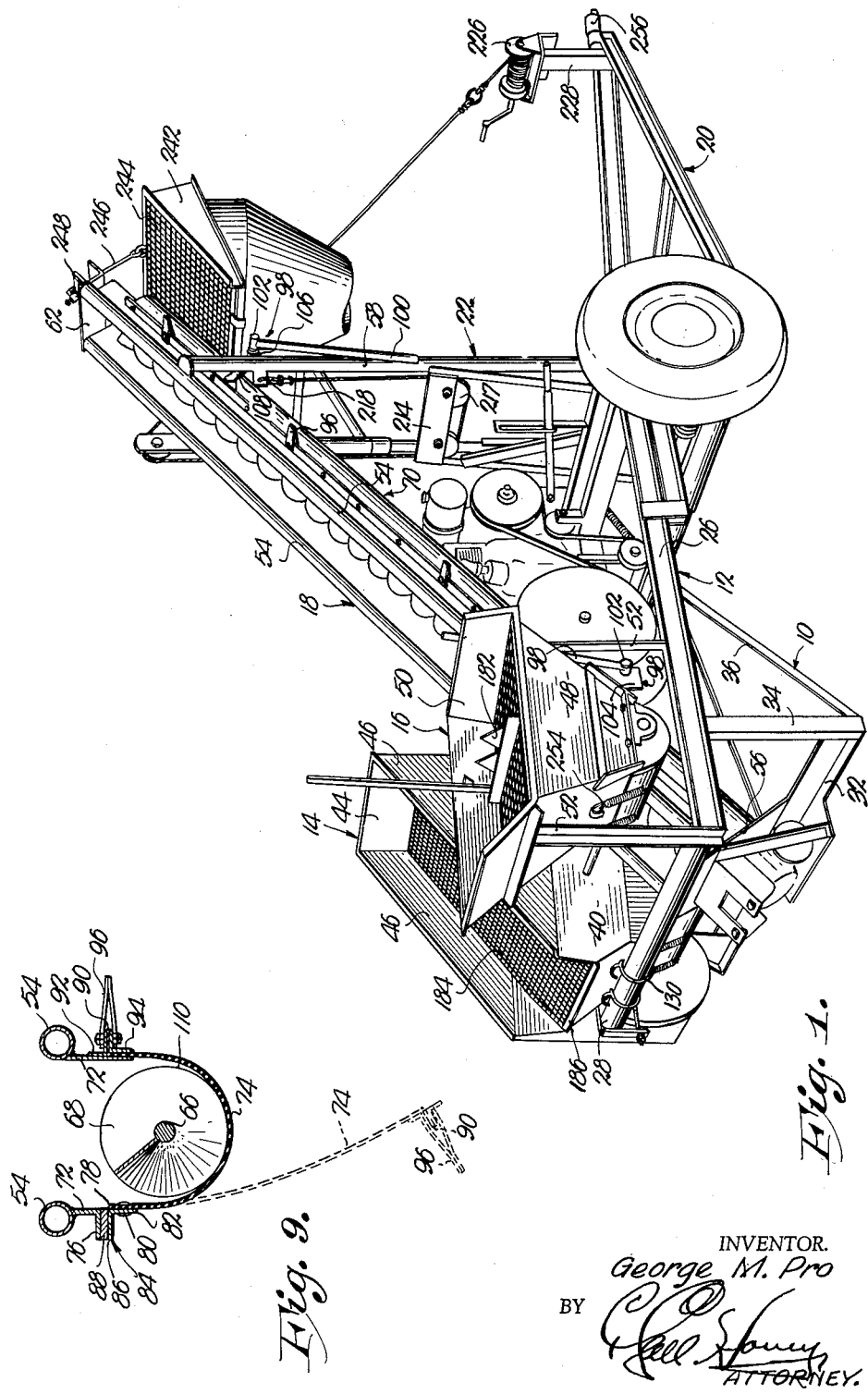
Figure 1 is a perspective view of a combined mixer and elevator embodying the principles of the present invention and looking from the rear toward the front of the same.
Fig. 9 is enlarged, cross-sectional view through the mixing and elevating conveyor assembly of the machine.

A combined mixer and conveyor embodying the concepts of the present invention and shown in the drawings in its preferred form is designated generally by the numeral 10 and includes as basic components, a frame 12, sand and cement hopper and translating means 14 and 16 respectively, a combination mixing and elevating conveyor 18 mounted on frame 12 between sand and cement handling apparatus 14 and 16, a secondary towing and stabilizing frame 20, mast structure 22 mounted on the end of frame 12 adjacent secondary frame 20 supporting the uppermost end of conveyor 18 and means for lowering and raising one end of secondary frame 20 relative to the adjacent end of frame 12, and power operated mechanism 24 coupled with material moving components mounted within material handling apparatus 14 and 16 as well as conveyor 18.

Figure 3:
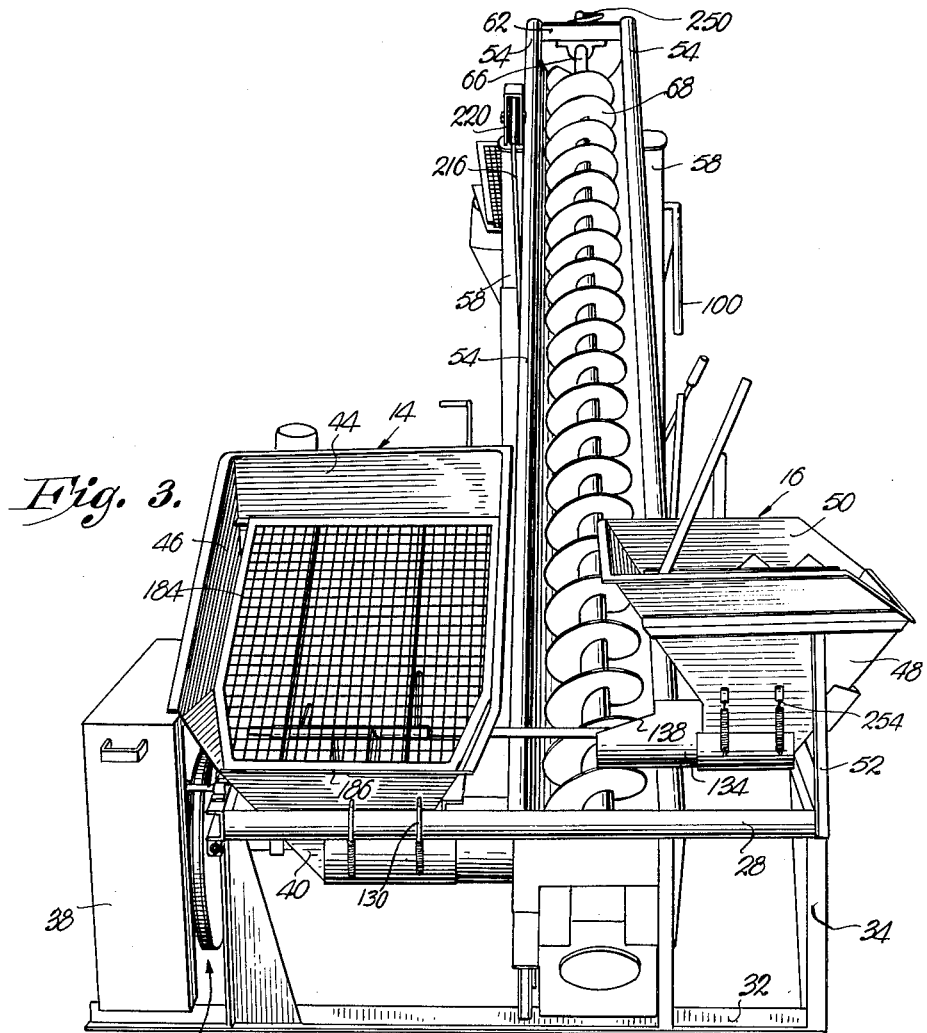
Fig. 3 is a rear elevational view of the instant machine.

Frame 12 comprises a pair of elongated channels 26 interconnected at opposed ends thereof by tubular members 28 and 30, while a substantially L-shaped element 32 is disposed in transversely extending, vertically spaced relationship to channels 26 and suspended from the latter by a pair of upright supports 34 welded to opposed ends of element 32 and to the underface of corresponding channels 26, as best shown in Fig. 1. Angularly disposed braces 36 interconnecting element 32 and spaced portions of frame 12 reinforce upright supports 34. As illustrated in Fig. 3, the end of element 32 adjacent sand handling apparatus 14 preferably extends outwardly from a respective support 34 to thereby serve as a lower support for a rectangular housing 38 enclosing a part of power operated mechanism 24.

Sand and cement handling apparatus 14 and 16 are mounted on frame 12 adjacent cross member 28, apparatus 14 including a substantially frusto-pyramidal sand hopper 40 and having a substantially U-shaped, transversely triangular, upper backing section 42 including a rear, upright, rectangular wall 44 remote from cross member 28 and a pair of triangular side walls 46 integral with opposed upright edges of wall 44 and top segments of hopper 40. As is clear from Fig. 1, the upper edge of wall 44 is spaced vertically from the top edge of the forward part of hopper 40 whereby the inner face of wall 44 serves as a backboard to cause material thrown thereagainst to gravitate into hopper 40. Furthermore, triangular side walls 46 prevent material fro escaping from apparatus 14 when the same is thrown against back wall 44.

Cement handling apparatus 16 also includes a substantially frusto-pyramidal hopper 48 having a substantially U-shaped, outwardly flared lip 50 integral with the upper edge thereof and disposed with the open side thereof facing outwardly in parallelism with an adjacent channel 26, it being noted that hopper 48 is supported on frame 12 by a number of uprights 52 adjacent the corner of frame 12 opposed to hopper 40 and in proximity to crossbar 28.

It is to be noted that the lower end of hopper 48 is disposed substantially within the plane of frame 12 while the lower extremity of hopper 40 is located substantially below the defined lower end of hopper 48. Conveyor 18 mounted on frame 12 between hoppers 40 and 48 includes a pair of parallel, inclined, elongated, tubular members 54 welded at the lowermost ends thereof to an angularly disposed baffle plate 56 spanning the distance between element 32 and cross member 28 intermediate supports 34, while the upper extremities of tubular members 54 are welded to parallel, upright tubular elements 58 mounted on cross member 30. A mounting plate 62 welded to and extending transversely of members 54 at the upper ends thereof maintain the latter in parallel, spaced relationship and also serves as means for mounting a thrust bearing 64 rotatably receiving the uppermost end of a shaft 66 provided with a vane 68 wound spirally therearound and extending substantially the length of shaft 66.

Conveyor 18 also includes a substantially U-shaped, upwardly facing trough 70 carried by spaced members 54 and including a pair of elongated mounting strips 72 welded to the underfaces of respective members 54, extending longitudinally of the latter and adapted for mounting a rectangular boot 74 of a flexible, wear-resistant composition such as fabric reinforced rubber. As best shown in Fig. 9, one of the strips 72 and preferably the one adjacent hopper 40 includes a laterally extending, longitudinal leg portion 76 integral with the margin of strip 72 remote from a corresponding member 54, while the longitudinally extending edge 78 of boot 74 is connected by rivet means 80 to leg 82 of an L-shaped, longitudinally extending bracket 84. The leg 86 of bracket 84 is secured to leg portion 76 of strip 72 by suitable means, with a spacer strip 88 being disposed between leg portion 76 and leg 86. The other longitudinal extremity 90 of boot 74 is secured between a pair of oppositely facing, elongated angle brackets 92 and 94, with a number of outwardly projecting handle units 96 being secured to proximal parallel legs of brackets 92 and 94 to facilitate movement of boot 74 to and from its closed position. As best shown in Fig. 9, angle brackets 92 and 94 are disposed with one of the legs thereof adapted to lie flush with the outermost face of the corresponding strip 72 when extremity 90 of boot 74 is in overlying relationship to the outer surface of the corresponding strip 72.

Means for maintaining boot 74 in a closed position defining trough 70 includes a pair of cam mechanisms 98 each including an arm 100 secured to a pivot pin 102, one of the pins 102 being rotatably carried by the lower end of a support 104 depending from a cross member (not shown) carried by the upper end of one of the uprights 52 and the adjacent tubular member 54, while the other pin 102 is rotatable within a bracket 106 welded to the element 58 on the proximal side of conveyor 18. Elongated cam elements 108 rigidly secured to the innermost end of each pin 102 are of sufficient length to engage the underface of the outwardly projecting leg of angle bracket 94 to thereby move brackets 92 and 94 into flush engagement with the outer face of a respective strip 72. It should be noted at this juncture that cam elements 108 on cam mechanisms 98 are of sufficient length to force the inner face of boot 74 into engagement with the peripheral edge 110 of vane 68, with boot 74 assuming a substantially U-shaped configuration and thereby presenting the major portion of trough 70.

The lowermost end of shaft 66 terminates adjacent baffle plate 56 and has a polygonal head 112 thereon slidably received within a complemental socket 114 located within trough 70 adjacent the inner surface of baffle plate 56, with socket 114 being connected to a driving shaft 116 constituting the output shaft of a gear reducer unit 118 mounted on the outer face of baffle plate 56 and having an input shaft pulley 120 thereon driven by a part of mechanism 24 in a manner to be described more fully hereinafter.

A horizontally disposed, tubular conduit 122 intercommunicates the lower end of hopper 40 with trough 70 adjacent baffle plate 56, a transversely arcuate, perforated adapter panel 124 connected to conduit 122 also presenting a limited portion of trough 70 at the lower end thereof. A horizontal sand feed auger 126 rotatably mounted within hopper 40 at the lower end thereof is disposed to direct sand from hopper 40 into trough 70 and therefore, feed auger 126 extends through conduit 122 a sufficient distance to force sand through perforated panel 124 directly into conveyor 18. The lowermost end of hopper 40 is open but normally closed with a flexible trap door 128 secured to hopper 40 at one edge thereof and provided with fastening means 130 on the opposite margin thereof adapted to be hooked over cross member 28 as shown in Fig. 1, to thereby releasably maintain flexible trap door 128 in closing relationship to the open end of hopper 40. Trap door 128 preferably is constructed of similar material as that from which boot 74 is fabricated.

Figure 4:
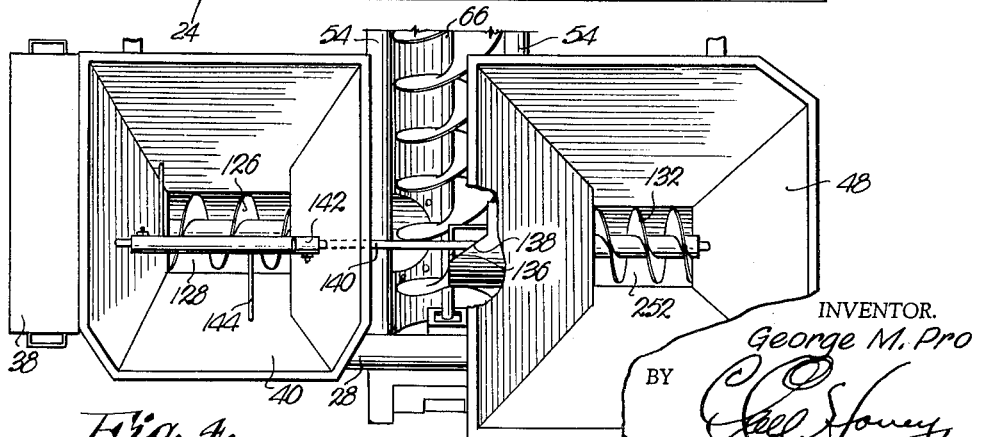
Fig. 4 is a fragmentary, plan view of the combined mixer and elevator with certain parts thereof being broken away to reveal the details of the components thereunder.

Cement hopper 48 also has a material feed auger 132 in the lower end thereof disposed in parallel, vertically spaced relationship to feed auger 126 and extending through a tubular element 134 connected to the lower end of hopper 48 and projecting laterally therefrom into overlying relationship with trough 70, as shown best in Fig. 3. The outermost end of element 134 is partially closed with a vertical, semicircular plate 136 with a cutout 138 in the cylindrical wall of element 134 causing material to be forced over the top edge of plate 136 into trough 70 during rotation of auger 132. During rotation of feed auger 132 in a direction to move cement from hopper 48 into trough 70, such cement is permitted to gravitate into trough 70 at a point above vanes 68 of conveyor 18 and also spaced longitudinally of trough 70 above the area at which sand is directed into conveyor 18 through conduit 122. Horizontal shaft 140 of feed auger 132 extends through tubular element 134 and also in traversing relationship to an upper portion of hopper 40, and terminates outwardly of the latter in substantially overlying relationship to a proximal channel 26 of frame 12. A sleeve 142 releasably secured to shaft 140 within hopper 40 has a number of radially extending, circumferentially spaced agitators 144 thereon for tumbling and breaking up the sand within hopper 40 during rotation of shaft 140 and thereby agitators 144. In order that shaft 146 of feed auger 126 and shaft 140 of feed auger 132 may be driven in one direction and yet feed sand and cement respectively into conveyor 18, the vanes of augers 126 and 132 are wound in opposite directions, as illustrated in Fig. 4, to effect the desired translation of sand from hopper 40 and cement from hopper 48 into trough 70.

Mechanism 24 for rotating shafts 140 and 146 in a common direction includes a relatively large pulley 148 secured to shaft 146 externally of hopper 40 and operably coupled with a small pulley 150 by a V-belt 152, pulley 150 in turn being carried by a horizontal shaft 154 carried by frame 12 in transversely extending relationship to channels 26 and rotated by a relatively large pulley 156 in turn driven by a V-belt 158 passing over the drive pulley 160 of gasoline engine 162. V-belt 158 is trained over a pair of idlers 1663 and 164 as well as input shaft pulley 120 of gear reducer unit 118. Although belt 158 could be trained over pulley 156, satisfactory operation has been found to be obtained by passing belt 158 under a portion of pulley 156 and in engagement therewith, as shown in Fig. 5. Another spring biased idler 165 carried by frame 12 and engaging belt 152 maintains the same in relatively taut condition during operation of mechanism 24.

A manually adjustable, variable ratio pulley 166 secured to shaft 146 outboard of pulley 148 is operably coupled with pulley 168 secured to the outer end of shaft 140 by a V-belt 170 trained over pulleys 166 and 168 as well as a spring biased idler 172. The outer end of shaft 146, which is externally threaded has a nut 174 thereon to permit manual adjustment of the ratio of pulley 166 as desired. Idler 172 maintains belt 170 in firm engagement with the respective pulleys, regardless of the spacing of the discs of pulley 166 as determined by the position of nut 174 on the threaded end of shaft 146.

Since feed auger 132 may be driven at a variable speed relative to feed auger 126, the ratio of cement to sand may be readily changed by adjusting nut 174 and in order that predetermined ratios may be obtained, an indicator arm 176 is pivotally mounted on the adjacent channel 26 of frame 12 and is adapted to be swung into engagement with V-belt 170 at pulley 166 whereby the upper end of arm 176 indicates the ratio on a prealigned scale 178.

Rectangular screen 180 within hopper 48 at the upper end thereof is provided with a sack opener 182 to facilitate introduction of cement into hopper 48, while a polygonal screen 184 located within hopper 40 prevents large lumps of sand from passing into hopper 40 and also keeps foreign materials from being introduced into machine 10. Screen 184 is inclined so that the front edge of the same is substantially lower than the rear edge thereof, with such rear edge resting against the inner face of wall 44 while the front edge of screen 184 is in proximal relationship to edge section 186 of hopper 40. It is to be pointed out that edge section 186 of hopper 40 is disposed in sufficient proximity to the ground to permit the operator of machine 10 to readily hand shovel sand into hopper 40 through the open top thereof without extremely tiring work being required and during continuous operation of conveyor 18. In other words, the operator may shovel sand into the open top of hopper 40 with a continuous upward motion and it is not necessary to lift the shovel of sand to a relatively high elevation prior to dumping of the sand into the open top of the hopper. In order to accomplish the desired results, it is to be preferred that the edge section 186 of hopper 40 be less than three feet from the ground in order to permit the operator to substantially continuously shovel sand into apparatus 14 without becoming overtired.

Axle 188 pivotally mounted on channels 26 of frame 12 in transversely extending relationship thereto and proximal to cross member 30 has substantially L-shaped end segments 190 integral with opposed extremities thereof and rotatably mounting wheels 192 imparting roadability and portability to machine 10. Coil springs 194 surrounding axle 188 at each of the defined extremities thereof are secured to respective channels 26 and also to axle 188 by corresponding stops 195 welded to axle 188.

Secondary frame 20 preferably includes a pair of angularly disposed channels 196 converging as their outermost extremities are approached remote from frame 12 and interconnected by a number of transverse elements 198. Structure slidably receiving cross member 30 of frame 12 includes a pair of parallel, upright angle irons 200 and 202 located at each end of a channel 196 in parallel relationship and each pair disposed in spaced apart relationship a distance slightly greater than the diameter of cross member 30. The upper ends of each pair of angle irons 200 and 202 are interconnected by a cross pin 204 serving to maintain angle irons 200 and 202 in proper spatial relationship. A removable pin 206 of sufficient length to extend in traversing relationship to angle irons 200 and 202 is adapted to be placed within a pair of aligned openings in respective angle irons 200 and 202, the aligned openings at the upper ends of such angle irons being located a distance spaced from respective cross pins 204 substantially equal to the diameter of cross member 30, while the openings at the lower extremities of angle irons 200 and 202 are likewise spaced above the upper proximal surfaces of channels 196 a distance only slightly greater than the diameter of cross member 30. Chains 208 connected to pins 206 prevent the same from becoming lost, inasmuch as such chains are secured to corresponding angle irons 202, yet permit insertion of pins 206 in either pair of aligned openings at the upper and lower ends of angle irons 200 and 202.

Winch mechanism fair raising and lowering the end of secondary frame 20 adjacent cross member 30 includes a tubular element 210 welded to and extending between the ends of channels 196 adjacent frame 12, with the lower ends of upright, parallel rods 212, disposed in horizontally spaced relationship, being secured to a sleeve 60 rotatably surrounding cross element 210. Cross structure 214 secured to the upper ends of respective rods 212 mounts pulley means 217 receiving a portion of the runing end of a cable 216 having the standing end thereof secured to a bracket 218 mounted on one of the upright elements 58, while cable 216 also passes over a pulley 220 rotatably carried at the uppermost end of the opposite element 58. Element 58 having pulley 220 thereon is substantially longer than the opposite element 58 to thereby permit more efficient raising and lowering of the inner end of frame 20 as the running end of cable 216, joined to another cable 222 by releasable connector means 224, is taken up and let out by a hand operated winch 226 carried by an upright post 228 secured to frame 20 at the juncture of channels 196.

As heretofore indicated, the uppermost end of shaft 66 extends through plate 62 and the thrust bearing 64 carried therein, and a sleeve 230 rigidly secured to the upper end of shaft 66 engages the outer edge of bearing 64 to thereby prevent movement of shaft 66 toward the baffle plate 56. Sleeve 230 is positioned on shaft 66 in a location to maintain head 112 in spaced relationship to the innermost surface of socket 114, as shown in Fig. 10, to thereby prevent any of the weight of helix conveyor 66—68 as well as material within trough 70 from being translated to gear reducer 118 through output shaft 116 thereof.

The uppermost end of boot 74 terminates in spaced relationship below plate 62 to thereby permit material moved upwardly by helix conveyor 66—68 to be pushed over the upper lip of boot 74. A substantially frusto-conical hopper 232 mounted on a sleeve 234 by arms 236, with sleeve 234 in turn being slidably and rotatably disposed on the element 58 having pulley 220 thereon, permits hopper 232 to be swung to and from a position beneath the upper arcuate lip of boot 74. The normal folded position of hopper 232 is illustrated in Fig. 2, while the normal position during use thereof is shown in Fig. 1. It can be appreciated that before hopper 232 is swung to a position underlying the upper lip of boot 74, elongated rod 238 releasably connected to the upper end of element 58 having pulley 220 thereon and to the frame 20 adjacent the juncture of channels 196, is removed. A tubular cam element 240 secured to element 58 mounting hopper 232 engages sleeve 234 to maintain the same in proper vertical relationship above frame 12 and also serves to provide a stop for maintaining hopper 232 in a desired location directly beneath the upper end of trough 70.

U-shaped screen frame 242 carried by hopper 232 at the upper open end thereof and having a rectangular screen 244 thereon is provided with an elongated connecting bolt 246 releasably secured to a bracket arm 248 pivotally mounted on plate 62. A cam lug 250 projecting outwardly from shaft 66 is disposed to engage bracket arm 248 during rotation of conveyor 66—68 to thereby reciprocate frame 242 and shake material disposed on screen 244.

Although not illustrated in detail, the lower open end of hopper 48 is normally closed with a flexible trap door 252 similar to trap door 128 and releasably maintained in closed position by fastening means 254 on the outer forward face of hopper 48.

The operation of machine 10 will initially be described assuming that the same is in a position to be towed from a suitable vehicle by the coupling 256 at the forward end of frame 20 adjacent winch 226 and with the weight of the entire unit supported on wheels 192 and element 32 spaced above the ground, as shown in Fig. 2. For towing purposes, winch 226 has been turned to pull in cables 222 and 216 to thereby move angle irons 200 and 202 upwardly with respect to cross member 30 to a position adjacent and preferably engaging the upper surfaces of channels 196. Thereupon, the pins 206 have been placed in corresponding aligned openings at the lower extremities of angle irons 200 and 202 so that pins 206 engage the upper surface of cross member 30. In this manner, cross member 30 bears against pins 206 and the end of frame 12 having apparatus 14 and 16 thereon may be moved upwardly to a point whereby element 32 clears the ground to permit machine 10 to be towed over the ground.

After reaching a desired destination, winch 226 is turned in the opposite direction to play out cables 222 and 216, whereby the latter passes over respective pulleys 220 and 217 and permitting the end of frame 12 having hoppers 40 and 48 thereon to pivot about the axis of cross member 30. When element 32 reaches the ground, pins 206 are pulled out of the openings at the lower extremities of angle irons 200 and 202 and winch 226 is again operated to permit the ends of channels 196 adjacent frame 12 to be lowered into engagement with the ground, whereby cross member 30 moves upwardly between respective angle irons 200 and 202 to a position engaging or substantially proximal to pins 204. Pins 206 are then replaced in their upper openings whereby the weight of machine 10 adjacent cross member 30 rests on pins 206, it being appreciated that when material is introduced into trough 70 and conveyed upwardly by helix conveyor 66—68, the additional weight in machine 10 causes coil springs 194 to flex and thereby preventing the weight from being transferred to the ground via axles 188 and wheels 192.

Mixing and conveying of sand and cement into hopper 232 is accomplished by starting engine 162, whereby pulley 120 is rotated through belt 158 passing over drive pulley 160 on engine 162 and also pulley 156 is turned to actuate pulley 148 coupled with pulley 150 through belt 152, thereby effecting rotation of auger 126 within the lower end of hopper 40 as well as conduit 122. Simultaneously therewith, shaft 140 is also rotated through belt 170 passing over variable ratio pulley 166 on shaft 146, with idler 172 maintaining such belt in taut condition. Feed auger 132 in hopper 48 and tubular element 134 are rotated by pulley 168 with the vanes of auger 132 disposed to force material from hopper 48 toward trough 70, notwithstanding the fact that shafts 140 and 146 are turning in the same direction.

Cement is directed into the open top of hopper 48 and sack opener 182 facilitates cutting of the paper bag to minimize motions necessary to introduce such material into hopper 48. The rotating auger 132 moves the cementitious material through tubular element 134 where the same is discharged into trough 70 through cutout 138. It is to be understood that the quantity of cement discharged into trough 70 is directly proportional to the speed of rotation of shaft 140 and such speed can be selectively changed by rotating nut 174 on shaft 146 to change the ratio of pulley 166. Scale 178 indicates the ratio of cement to sand when arm 176 is moved into engagement with belt 170 to cause the upper end of such arm to move to a point on scale 178 showing the ratio of sand and cement.

The operator of machine 10 shovels sand into hopper 40 and as previously indicated, the disposition and configuration of sand receiving apparatus is designed to permit such operator to substantially continuously shovel sand into hopper 40 without becoming overtired. Edge section 186 is located in relatively close proximity to the ground and rear wall 44 permits shoveling of the sand in a manner to strike the back wall prior to gravitating into the hopper 40. Auger 126 within hopper 40 feeds the sand into trough 70 through the perforation in panel 124 at a predetermined rate. Also, the radially extending agitators 144 on shaft 140 keep the sand in a loose condition, notwithstanding the fact that the same may be relatively moist, and hereby precludes clogging up of the sand within hopper 40 and feed auger 126.

Introduction of cement into trough 70 at a point above the area at which said is directed into conveyor 18 is an important feature of the instant invention because packing of cementitious material in the lower end of trough 70 against the innermost face of plate 56 is precluded. It can be recognized that oftentimes the sand has a slight amount of water in the same and if the cement were directed into trough 70 at the same point at which sand was passed thereinto, there would be a tendency for the moisture to cause the cement to become compacted at the lower end of the conveyor and thereby stop rotation of the same.

As the sand and cement are moved upwardly within trough 70 by the vanes 68 on shaft 66, the materials are thoroughly mixed because of the tendency of the particles to gravitate down the inclined length of trough 70 so that rolling and tumbling of the materials is obtained during upward movement of the same. It can be recognized that it takes a relatively long period for each particle of the different materials to reach the top of trough 70 because of rearward movement of the particles of said and cement, notwithstanding the fact that the same are also moved upwardly by the helix conveyor.

When the admixed materials reach the top of boot 74, they gravitate over the arcuate edge thereof into hopper 232 which has been swung about element 58 to a position underlying trough 70. During rotation of shaft 66, lug 250 thereon engages bracket arm 248 to reciprocate bolt 246 and in turn, screen frame 242 to assure screening of the admixed material as the same passes through screen 244 into hopper 232.

It is to be explained that secondary frame 20 is particularly adapted for mounting a machine for utilizing the admixed sand and cement and which may be a concrete gun or the like disposed on bracing elements 198.

The provision of a flexible boot 74 defining the major portion of trough 70 is a further important feature of the invention because of the way in which flexible boot 74 operates to prevent formation of a coating of admixed sand and cement on the inner face of the inclined trough and which would operate after a period of time to stop rotation of helix conveyor 66—68 and in fact, bend shaft 66 under certain conditions. As the material tends to build up a coating on the inner surface of boot 74 because of the troweling action of edges 110 of vane 68, the area of boot 74 directly below such coating flexes and effects crumbling of the coating to thereby preclude continued build-up of the same.

The self-cleaning features of machine 10 are of importance because hoppers 40 and 48 as well as trough 70 may readily be cleaned in a minimum of time. Arms 100 may be swung in a direction to move cams 108 out of engagement with brackets 94 to permit longitudinal extremity 90 of boot 74 to move to the dotted line position thereof shown in Fig. 9, whereby all materials within trough 70 may readily gravitate therefrom. By the same token, fastening means 130 and 254 of trap doors 128 and 252 respectively may be moved to a position permitting such trap doors to fall away from the open ends of respective hoppers 40 and 48, whereby the material may gravitate from the same.

When it is desired to move machine 10 to another location, the procedure of raising cross element 210 and thereby angle irons 200 and 202 relative to cross member 30 may be repeated and, upon insertion of pins 206 at the lower extremities of angle irons 200 and 202, machine 10 may again be tilted about the axle 188 to move element 32 out of engagement with the ground and permit towing of the unit.

Having thus described the invention what is claimed as new and desired to be secured by Letters Patent is:

1. In a combined mixer and elevator, a frame adapted to be disposed on the ground; an elongated, inclined combination material mixing and elevating assembly carried by the ground including an angularly-positioned, upwardly facing trough disposed with the lower end thereof in close proximity to the ground when the frame is supported thereby, and the uppermost end of the trough being spaced a substantial distance from the ground, said elevating assembly being provided with a helix conveyor rotatably mounted within the trough and extending substantially the length thereof, said helix conveyor having a spiral vane disposed with the marginal edge thereof in frictional engagement with the proximal, opposed base of the trough; a pair of open-topped, horizontally spaced hoppers mounted on the frame on opposite sides of said trough and adjacent said lowermost end thereof, each of said hoppers being adapted to receive a different material, the upper margin of one of the hoppers defining said open top thereof being disposed at a sufficient angle to cause the lowermost edge of said margin to be located in relatively close relationship to said lowermost end of the trough and thereby the ground, to permit relatively easy hand shoveling of a first material disposed on the ground into said one hopper through the open top thereof, the lower extremity of said one hopper terminating in substantially direct horizontal alignment with said lowermost end of the trough, the upper margin of the other hopper defining said open top thereof to thereby permit dumping of a second material into said other hopper from bags, the lower extremity of said other hopper terminating slightly above the horizontally aligned portion of the trough; horizontal first tubular means intercommunicating the lower extremity of said one hopper with the opposed aligned portion of said trough; horizontal second tubular means communicating with and extending from the lower extremity of said other hopper and terminating in overlying relationship to the proximal horizontally aligned portion of said trough for discharging said second material thereinto; conveyor structure within each of said first and second tubular means for translating respective materials horizontally from corresponding hoppers into said trough; and means carried by the frame and operably coupled to one of said conveyor structures for driving the latter at selectively variable speeds relative to the other of said conveyor structures whereby the ratio of said first and second materials directed into said trough from said hoppers may be changed.

2. A combined mixer and elevator as set forth in claim 1, wherein said trough is provided with a longitudinally extending, centrally disposed, lower section of a flexible, wear-resistant composition and defining a portion of said trough whereby when materials within the trough begin to build up and form a coating between the marginal edge of the conveyor and said section because of the troweling action of the spiral vane during rotation thereof, the area of said section beneath said coating flexes to cause the latter to crumble and thereby preventing continued build-up of material against said face of the trough.

3. A combined mixer and elevator as set forth in claim 2, wherein said trough includes a pair of longitudinally spaced, transversely arcuate plates, said section spanning the distance between said plates and one longitudinal margin thereof being secured to a proximal longitudinal edge of one plate and the other longitudinal margin of the section being releasably connected to the adjacent longitudinal edge of the other plate whereby upon release of said other margin from the other plate, the section is movable to a position permitting all material remaining in the trough to readily gravitate therefrom.

4. A combined mixer and elevator as set forth in claim 3, wherein said material translating means at the lower end of each conveyor includes a horizontal feed auger, said augers being located in vertically spaced relationship and having rotatable shafts provided with vanes thereon wound around the same in directions to move material from respective hoppers into said trough as the shafts are rotated in the same direction.

5. A combined mixer and elevator as set forth in claim 4, wherein is provided power means operably coupled with said shafts of the augers for rotating one of the same at a constant speed and the other auger at a variable speed.

6. A combined mixer and elevator as set forth in claim 5, wherein is provided pulley means on the ends of said shafts of the feed augers and belt means operably coupling the pulleys with said pulley means, the pulley means on one of said shafts of the feed augers including a manually adjustable variable ratio pulley permitting selective variation of the speed of one of the feed augers relative to the other feed auger.

7. A combined mixer and elevator as set forth in claim 5, wherein is provided gear means connected to said shaft of the conveyor at the lower end of the same for rotating the latter and means operably coupling the gear means with said power means whereby the conveyor and said feed augers are simultaneously rotated during operation of said power means.

8. A combined mixer and elevator as set forth in claim 7, wherein is provided a thrust bearing mounted on the upper end of the trough and rotatably receiving the upper end of the shaft of said conveyor, there being means on the outermost end of said shaft and engaging said bearing for preventing reciprocation of said shaft of the conveyor toward said gear means at the lower end of the same whereby the weight of said conveyor and the material in said trough is carried by said bearing.

9. A combined mixer and elevator as set forth in claim 1, wherein each of the conveyor structures is open along the longitudinal, lowermost length thereof and wherein is provided trap door means pivotally mounted on each structure and normally closing the lower extremity of respective structures for permitting material contained in said hoppers to readily gravitate therefrom through corresponding structures connected thereto upon pivoting of respective trap doors to the open positions thereof.

References Cited in the file of this patent

UNITED STATES PATENTS

| | | |
|---|---|---|
| 1,356,296 | Casse | Oct. 19, 1920 |
| 1,611,297 | Wickey | Dec. 21, 1926 |
| 1,816,405 | Smith | July 28, 1931 |
| 1,823,270 | Hahn | Sept. 15, 1931 |
| 1,906,247 | Buff | May 2, 1933 |
| 1,922,023 | Baer | Aug. 15, 1933 |
| 2,493,898 | Pollity | Jan. 10, 1950 |
| 2,697,510 | Morrison | Dec. 21, 1954 |
| 2,795,432 | Martt | June 11, 1957 |
| 2,815,117 | Lapeyre et al. | Dec. 3, 1957 |
| 2,872,204 | Blubaugh | Feb. 3, 1959 |

FOREIGN PATENTS

| | | |
|---|---|---|
| 727,630 | Great Britain | Apr. 6, 1955 |